Feb. 8, 1966    K. J. G. MÅRTENSSON ETAL    3,233,327
METHOD AND APPARATUS FOR CONTINUOUS SEPARATION
OF BUTTERMILK AND BUTTER GRANULES
Filed July 8, 1964
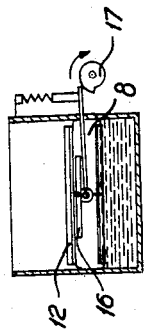
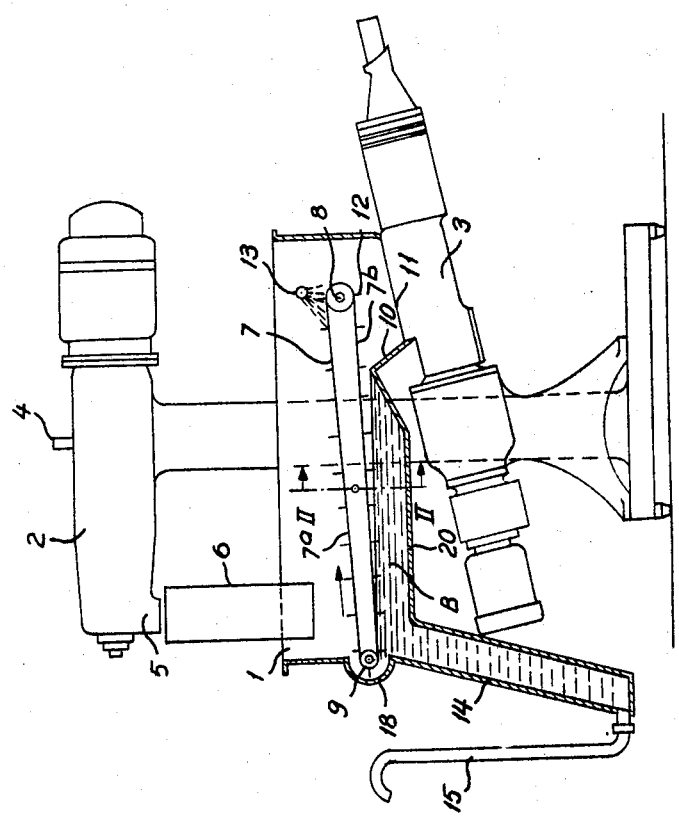
INVENTOR.
Claes Bertil Sjöholm
Karl Johan Georg Mårtensson
BY
Davis, Hoxie, Faithfull + Hapgood
ATTORNEYS 3,233,327
METHOD AND APPARATUS FOR CONTINUOUS SEPARATION OF BUTTERMILK AND BUTTER GRANULES
Karl Johan Georg Mårtensson, Lund, and Claes Bertil Sjöholm, Malmo, Sweden, assignors to ALFA-Laval AB, Stockholm, Sweden, a corporation of Sweden
Filed July 8, 1964, Ser. No. 381,030
Claims priority, application Sweden, July 10, 1963, 7,657/63
10 Claims. (Cl. 31—89)

The present invention relates to an improved method and apparatus for separating buttermilk and butter granules in the continuous production of butter.

Continuously operating butter machines involve two major difficulties, namely, to separate efficiently the butter granules from the buttermilk and to relieve the butter granules from adhering buttermilk without diluting the buttermilk with washwater when washing the butter granules.

Both of these drawbacks are eliminated by the present invention. According to the invention, the mixture of buttermilk and butter granules is led to a butter granule separator, where the mixture is discharged upon an endless conveyor belt in the form of a screen provided with cross-strips. The endless screen belt is so arranged that, when it is driven, the cross-strips on its lower pass extend partly below the surface of the buttermilk in the separator in order to carry the butter granules up to the upper pass of the running belt, where they are washed and discharged together with the washwater while the buttermilk (which is free from washwater) is discharged separately.

An apparatus made according to the invention comprises a container having a level-maintaining outlet for the buttermilk and a separate outlet for the butter granules and the washwater, these outlets being separated from each other buy cross-partition in the container. The endless screen-belt is arranged to run lengthwise in the container over return rolls so that the cross-strips are immersed in the buttermilk adjacent one of the return rolls as the belt is driven. The container has an inlet for the mixture of buttermilk and butter granules, this inlet being arranged above the belt adjacent the aforementioned one return roll. The outlet for the butter granules is arranged near the opposite return roll of the screen-belt, at the other side of the partition. The apparatus allows an efficient separation and washing of the butter granules without any dilution of the buttermilk with washwater.

The invention is described more in detail below, reference being made to the attached drawing which shows an embodiment of the invention taken by way of example. In the drawing, FIG. 1 is a side elevational view, partly in longitudinal section, of a butter machine; and FIG. 2 is a sectional view along the line II—II in FIG. 1, showing the addition of vibrating means for the screen-belt.

The butter machine shown in the drawing is of the Fritz type and comprises a churning section 2 and a kneading section 3 as well as a separator 1 arranged between these two sections. The cream to be churned is led into the churning section through a pipe 4. The mixture of buttermilk and butter granules thus obtained is discharged from the churning section through an outlet 5 and conveyed to the separator 1 by a pipe 6. The separator as shown has the shape of an elongated container, one end of which communicates through a bottom outlet opening 11 with the inlet of the kneading section 3. An endless screen-belt 7, the width of which stretches across the whole width of the container, is arranged lengthwise in the container. The screen-belt runs on two return rolls 8 and 9, one of which is connected to a driving device (not shown). Cross-strips 12 extend across the whole width of the screen-belt and are secured thereon in any suitable manner.

A cross-partition 10 is provided at the bottom of the container 1 and prevents the buttermilk from flowing to the outlet 11 leading to the kneading section. The container has a second bottom outlet 14 at the end opposite the outlet 11. The outlet 14 is in the form of a hopper which communicates with a swiveling outlet pipe 15 by means of which the liquid level in the container may be controlled.

The return rolls 8 and 9 are located at different heights so that the strips 12 on the lower flight of the screen-belt extend below the buttermilk surface at the mixture input-end of the belt. When the screen-belt runs in the direction shown by the arrow in FIG. 1, the butter granules which have passed through the screen-belt 7 (and which float in the body of buttermilk B) are carried along by the strips 12 to a semi-circular recess 18 in the container end wall adjacent return roller 9, where these granules are lifted by the strips 12 from the body of buttermilk B in passing to the upper flight of belt 7. The semi-circular wall of recess 18 is only slightly spaced from the strips 12 passing around the return roller 9, so that the butter granules are compressed as they move upwardly around this roller. The buttermilk still adhering to the butter granules is washed off at the discharge end of the screen-belt 7 by means of a washing device 13, which is shown as a water supply pipe provided with perforations for spraying water against the surface of the screen-belt. In order to avoid mixing of the washwater with the buttermilk, the partition 10 is provided with an inclined plane which leads the water toward the outelt 11 and thus into kneading section 3. The washed butter clined plane which leads the water toward the outlet 11 when the screen-belt runs around the return roller 8. A partition (not shown) may also be located in the outlet 11, so that the washwater can be led off without entering the kneading section.

In order to accelerate draining of the buttermilk from the screen-belt, the latter may be subjected to vibrations by means of a lever system 16 which is actuated by a motor-driven eccentric 17, as shown in FIG. 2.

From the foregoing, it will be apparent that according to the new method a mixture of buttermilk and butter granules is fed continuously to the separating chamber in container 1 by way of inlet 6 at the top, the churn 2 constituting a means for supplying such mixture to the inlet. In the separating chamber, the mixture is strained by the strainer 7 to separate the coarser granules from the buttermilk, and the latter together with the fine granules are drained from this straining step into a body of buttermilk B in the underlying reservoir 20. The granules separated in the straining step are continuously moved through the chamber in a path extending above the body of buttermilk B and thence to the kneading zone 3 outside the chamber. The fine granules are continuously lifted from the surface of body B and moved through a second path (extending through recess 18 around return roller 9) which joins the aforementioned path of the coarser granules, so that both the fine and coarser granules are discharged to the kneading zone. At the same time, buttermilk is withdrawn continuously through outlet 14–15 from the body of buttermilk in reservoir 20.

The rollers 8 and 9 form means mounting the endless belt 7 for lengthwise movement through upper and lower flights 7a and 7b interposed between inlet 6 and reservoir 20 and extending over the granules outlet 11.

We claim:

1. In the production of butter, the mehtod comprising the steps of continuously feeding a mixture of buttermilk and butter granules to a separating chamber and there straining the mixture to separate the coarser granules from the buttermilk, draining the buttermilk and fine granules from said straining step into a body of buttermilk in said chamber, continuously moving said coarser granules from the buttermilk through the chamber in a path extending above said body and thence to a kneading zone outside said chamber, continuously moving fine granules upwardly from the surface of said body of buttermilk through a second path which joins said path of the coarser granules compressing the fine granules as they move through said second path, and continuously withdrawing buttermilk from said body.

2. The method according to claim 1, comprising also the step of washing the fine and coarser granules as they move through said path of the coarser granules.

3. Appataus for butter-making, which comprises a container having an inlet at the top, means for supplying a mixture of buttermilk and butter granules to said inlet, the container forming a buttermilk reservoir underlying said inlet, the container also having a buttermilk outlet leading from said reservoir and a granules outlet remote from said reservoir, an endless screen-belt, cross-strips on said belt, and means mounting said belt for lengthwise movement through upper and lower flights interposed between said inlet and reservoir and extending over said granules outlet, said mounting means having one portion positioned below the normal buttermilk level to immerse the cross-strips on said lower flight into a liquid body in said reservoir as the belt is driven in the direction to move said upper flight toward said granules outlet, whereby fine granules passing through the screen-belt are carried by the cross-strips from the reservoir and thence to said upper flight to join coarser granules retained by the belt.

4. Apparatus according to claim 3, in which the container includes a partition underlying the belt and located between the reservoir and said granules outlet.

5. Apparatus according to claim 3, in which said mounting means include a first return roller at the region of said reservoir and a second return roller overlying said granules outlet and located at a higher level than said first roller.

6. Apparatus according to claim 5, in which the container has an arcuate wall extending partly around said first roller in closely spaced relation to the cross-strips moving around said first roller, whereby said wall is operable to compress the granules moving on the screen-belt around said first roller.

7. Apparatus according to claim 3, comprising also means for vibrating the screen-belt.

8 Apparatus according to claim 3, comprising also means for controlling the buttermilk level in said reservoir 9. Apparatus according to claim 3, comprising also a washing device positioned in the container to direct a washing liquid on the granules carried by said upper flight at a region which is offset from overlying relation to the reservoir.

10. Apparatus according to claim 3, comprising also a kneading device communicating with said granules outlet.

References Cited by the Examiner

UNITED STATES PATENTS

| | | | |
|---|---|---|---|
| 890,684 | 6/1908 | Moul | 31—2 |
| 2,619,232 | 11/1952 | Parsons et al. | 31—2 |
| 2,705,562 | 4/1955 | Albertson | 210—526 |
| 2,746,605 | 5/1956 | Baum | 210—526 |
| 2,781,269 | 2/1957 | Harper et al. | 31—89 |
| 2,876,904 | 3/1959 | Fowler | 210—401 X |
| 3,071,860 | 1/1963 | Sjoholm et al. | 31—47 X |
| 3,085,333 | 4/1963 | Berge | 31—89 |
| 3,159,574 | 12/1964 | Benson | 210—400 |

FOREIGN PATENTS 888,351 8/1953 Germany.

SAMUEL KOREN, *Primary Examiner.*

ALDRICH F. MEDBERY, *Examiner.*